(12) United States Patent
Akkapeddi et al.

(10) Patent No.: US 8,822,001 B2
(45) Date of Patent: Sep. 2, 2014

(54) DELAMINATION RESISTANT MULTILAYER CONTAINERS

(75) Inventors: Murali K. Akkapeddi, York, PA (US); Brian A. Lynch, Merrimack, NH (US)

(73) Assignee: Graham Packaging Company, L.P., York, PA (US)

( * ) Notice: Subject to any disclaimer, the term of this patent is extended or adjusted under 35 U.S.C. 154(b) by 523 days.

(21) Appl. No.: 12/768,130

(22) Filed: Apr. 27, 2010

(65) Prior Publication Data

US 2011/0262668 A1    Oct. 27, 2011

(51) Int. Cl.
| | | |
|---|---|---|
| *B29D 22/00* | (2006.01) | |
| *B32B 27/34* | (2006.01) | |
| *B32B 27/36* | (2006.01) | |
| *B29B 11/14* | (2006.01) | |
| *B29C 45/00* | (2006.01) | |
| *B32B 27/08* | (2006.01) | |
| *B32B 27/18* | (2006.01) | |
| *B29L 31/00* | (2006.01) | |
| *B29B 11/08* | (2006.01) | |
| *B29C 49/22* | (2006.01) | |
| *B29K 67/00* | (2006.01) | |
| *B29C 45/57* | (2006.01) | |
| *B29K 105/00* | (2006.01) | |
| *B29K 77/00* | (2006.01) | |
| *B29K 677/00* | (2006.01) | |
| *B29C 49/78* | (2006.01) | |
| *B29C 45/16* | (2006.01) | |
| *B29C 49/06* | (2006.01) | |
| *B29C 49/12* | (2006.01) | |

(52) U.S. Cl.
CPC ....... *B29B 11/14* (2013.01); *B29B 2911/14446* (2013.01); *B29B 2911/1498* (2013.01); *B29B 2911/14113* (2013.01); *B29L 2031/7158* (2013.01); *B29B 2911/14326* (2013.01); *B29B 2911/1414* (2013.01); *B29B 2911/1412* (2013.01); *B29B 2911/14333* (2013.01); *B29B 2911/14153* (2013.01); *B29K 2995/0067* (2013.01); *B32B 27/34* (2013.01); *B29B 11/08* (2013.01); *B29C 49/221* (2013.01); *B29K 2067/003* (2013.01); *B29B 2911/14093* (2013.01); *B29C 45/57* (2013.01); *B32B 2307/7244* (2013.01); *B32B 27/36* (2013.01); *B32B 2270/00* (2013.01); *B29B 2911/14146* (2013.01); *B29B 2911/14653* (2013.01); *B29K 2105/258* (2013.01); *B29K 2077/00* (2013.01); *B29B 2911/14066* (2013.01); *B29B 2911/14593* (2013.01); *B29K 2677/00* (2013.01); *B29B 2911/14713* (2013.01); *B29B 2911/14646* (2013.01); *B29C 49/78* (2013.01); *B29C 45/16* (2013.01); *B29C 49/06* (2013.01); *B32B 2439/60* (2013.01); *B29B 2911/14466* (2013.01); *B29C 45/0025* (2013.01); *B32B 27/08* (2013.01); *B29B 2911/14126* (2013.01); *B29B 2911/14053* (2013.01); *B29C 49/12* (2013.01); *B29B 2911/1408* (2013.01); *B32B 27/18* (2013.01)
USPC ........................................................ 428/35.7

(58) Field of Classification Search
CPC ........ B32B 27/08; B32B 27/34; B32B 27/36; B32B 27/18; B32B 2270/00; B32B 2439/60; C08F 283/08; C08F 77/06
USPC ........................................................ 428/35.7
See application file for complete search history.

(56) References Cited

U.S. PATENT DOCUMENTS

| | | |
|---|---|---|
| 2,871,218 A | 1/1959 | Schollenberger |
| 3,356,646 A | 12/1967 | Wynstra et al. |
| 4,550,043 A | 10/1985 | Beck |
| 4,559,247 A | 12/1985 | Kopf et al. |
| 4,609,516 A | 9/1986 | Krishnakumar et al. |
| 4,710,118 A | 12/1987 | Krishnakumar et al. |

| | | | |
|---|---|---|---|
| 4,728,549 A * | 3/1988 | Shimizu et al. .............. 428/36.6 |
| 4,781,954 A | 11/1988 | Krishnakumar et al. |
| 4,963,311 A | 10/1990 | Aharoni et al. |
| 4,990,301 A | 2/1991 | Krishnakumar et al. |
| 5,021,515 A | 6/1991 | Cochran et al. |
| 5,032,341 A | 7/1991 | Krishnakumar et al. |
| 5,049,345 A | 9/1991 | Collette et al. |
| 5,098,274 A | 3/1992 | Krishnakumar et al. |
| 5,281,360 A | 1/1994 | Hong et al. |
| 5,319,039 A | 6/1994 | Moses et al. |
| 5,582,788 A | 12/1996 | Collette et al. |
| 6,054,533 A * | 4/2000 | Farkas et al. .................. 525/90 |
| 6,323,299 B1 * | 11/2001 | Handlin et al. ................. 528/65 |
| 6,794,463 B2 * | 9/2004 | Aramaki et al. ............. 525/425 |
| 7,357,889 B2 | 4/2008 | Vedula et al. |
| 7,427,430 B2 | 9/2008 | Rhee et al. |
| 7,491,359 B2 | 2/2009 | Bourgeois |
| 2002/0001684 A1 * | 1/2002 | Kim et al. .................... 428/35.7 |
| 2005/0009976 A1 | 1/2005 | Akkapeddi et al. |
| 2005/0148738 A1 * | 7/2005 | Leon et al. .................... 525/386 |
| 2006/0019045 A1 * | 1/2006 | Bourgeois .................... 428/35.7 |
| 2008/0153939 A1 | 6/2008 | Schmidt et al. |
| 2009/0277858 A1 | 11/2009 | Mitadera et al. |

OTHER PUBLICATIONS

W.J. Work et.al, "Definitions of Terms Related to Polymer Blends, Composites, and Multiphase Polymeric Materials" Pure Appl. Chem., vol. 76, No. 11, pp. 1985-2007 (2004).

* cited by examiner

*Primary Examiner* — James Yager

(74) *Attorney, Agent, or Firm* — Stradley Ronon Stevens & Young, LLP

(57) ABSTRACT

The present invention provides a multilayer plastic bottle comprising layers of PET and a polyamide such as, for example, MXD6, that is free from occurrence of delamination upon dropping or upon exposure to impact. The present inventors have found that when forming a barrier layer containing an adhesion promoting agent according to the present invention, an impact energy applied to the barrier layer is well reduced and the resultant multilayer bottle is improved in interlaminar bonding strength and prevented from suffering from delamination upon dropping, etc.

27 Claims, 2 Drawing Sheets

DELAMINATION RESISTANT MULTILAYER CONTAINERS

BACKGROUND OF THE INVENTION

The present invention relates generally to multilayer plastic containers, preforms and articles of manufacture, and more specifically to multilayer plastic containers and preforms that are resistant to delamination and provide a barrier to oxygen and other gases permeating through the layers of the container/preform wall.

All references, including publications, patent applications, and patents, cited herein are hereby incorporated by reference to the same extent as if each reference were individually and specifically indicated to be incorporated by reference and were set forth in its entirety herein.

It is well known in the art to provide thermoplastic packaging articles such as films, bottles, containers, and the like, which are useful for food and beverage packaging and which provide low oxygen permeability. Low oxygen permeability is important in the food & beverage industry because permeation of oxygen from air through the package can cause deterioration of the stored product—especially for the more highly oxygen-sensitive food & beverage products such as beer, orange juice, green tea and tomato-based products such as ketchups, salsas, pasta sauces and other processed food products.

In order to enhance freshness preservation, it is a standard practice to package food and beverage products within a packaging structure composed of laminated sheets of two or more plastics. Such packaging structures generally include at least one layer of an oxygen barrier material comprising a plastic which has a lower permeability to oxygen than the matrix polymer, which typically provides the structural and mechanical properties of the packaging structure. There are two general types of oxygen-barrier materials—passive and active. A "passive" barrier retards oxygen permeation into the package. For example, with multi-layer technology it is possible to incorporate thin layers of expensive barrier polymers (e.g., polyvinylidene chloride copolymer (PVDC), ethylene vinyl alcohol copolymer (EVOH), and poly-m-xylyleneadipamide (MXD6 or PA-MXD6)), in combination with structural layers of bottle-grade plastic resins (e.g., polyethylene terephthalate (PET)), to provide a cost-effective barrier package.

In an "active" barrier layer, an oxygen "scavenger" is incorporated into a single or multi-layer plastic structure to theoretically remove the oxygen initially present and/or generated from the inside of the package, as well as to retard the passage of exterior oxygen into the package. An example of an active barrier layer is the nylon MXD6 because it was discovered that MXD6 (as well as certain other nylons), in the presence of certain metals, reacts with molecular oxygen as it permeates through the wall of a container (see, e.g., U.S. Pat. No. 5,021,515). Thus, in addition to having good passive barrier properties, MXD6 is also employed as an active oxygen barrier layer in the presence of certain metals. Accordingly, MXD6 is widely used in the plastic packaging industry as either an active or a passive barrier layer in a multilayer container such as, for example, a multilayer PET container having the following configurations: PET/MXD6/PET or PET/MXD6/PET/MXD6/PET.

A problem with such PET/MXD6 multilayer containers is that the adhesive strength between the MXD6 layer and the layers of PET is weak. Thus, it is not uncommon for bottles formed with three or five layered constructions of PET and MXD6 or other nylons and nylon blends to delaminate due to the insufficient interlayer adhesion between adjacent layers, particularly after the preforms are stretch blow molded and filled with carbonated beverages under pressure or are hot filled. Such a delamination of the barrier material layer often increases after some storage time or moisture absorption, most likely due to the shrinkage caused by chain relaxation and post-crystallization of the barrier resin. The layer delamination in such bottles is further aggravated by impact stresses such as dropping the bottle from a height or impacting on the sidewalls. Stress concentration upon sudden impacts causes the initiation of layer delamination if the adhesion is poor.

The layer delamination problem in the multilayer PET bottles is undesirable not only for the retention of the structural integrity and aesthetic appearance of the bottle, but also for retaining its impact toughness and barrier performance. Accordingly, there is a need in the art for an adhesive-promoting material to be employed in conjunction with a barrier polymer such as, for example, MXD6 in the barrier layer and/or matrix layer of a multilayer plastic container/preform wall that is effective in increasing the interlaminar adhesion between the layers of different polymers in a multilayer plastic container to yield improved delamination resistance. Thus, it is an object of the present invention to provide a multilayer plastic container, preform or article of manufacture having suitable interlaminar adhesion between the several layers of the multilayer wall and having a high barrier against permeation of oxygen therethrough.

The present invention provides a solution to this practically significant problem in multilayer PET bottles by including a suitable thermoplastic compatibilizer additive to improve the adhesion between the PET and barrier polyamide layers. The adhesion-promoting thermoplastic additives of this invention have structural segments that are believed to be compatible with the PET and the barrier polyamide, bridging and strengthening the interface enough to cause high adhesion to PET in the multilayered containers.

BRIEF SUMMARY OF THE INVENTION

The present invention provides a multilayer plastic bottle comprising layers of PET and a polyamide such as, for example, MXD6, that is free from occurrence of delamination upon dropping or upon exposure to impact. The present inventors have found that when forming a barrier layer containing an adhesion-promoting agent according to the present invention, the resultant multilayer bottle is improved in interlaminar bonding strength and is prevented from suffering from delamination upon dropping, etc.

Specifically, the present invention provides a plastic container having a multilayer wall comprising: at least one layer of a polyester resin; at least one layer of a barrier resin comprising a polyamide; an adhesion promoting agent blended with the barrier resin and/or the polyester resin, wherein the adhesion promoting agent is at least one selected from either formula I or formula II:

wherein: X is a polyamide-compatible oligomeric or polymeric moiety; Y is a polyester-compatible oligomeric or polymeric moiety; n is an integer from 1 to 100; and m and p represent the mole fractions of the respective "mers," i.e., such that m+p=1.

In another aspect, the present invention provides A method of making a multilayer plastic container comprising the steps of: (a) blending with a barrier resin an adhesion-promoting agent selected from either formula I or formula II:

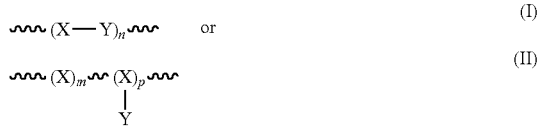

wherein: X is a polyamide-compatible oligomeric or polymeric moiety; Y is a polyester-compatible oligomeric or polymeric moiety; n is an integer from 1 to 100; and m and p represent the mole fractions of the respective "mers," i.e., such that m+p=1; (b) forming a preform in which the blend formed in step (a) is in layers alternating with layers of a polyester resin; reheating the preform; and blow molding the preform formed in step (b) into the multilayer container, wherein the adhesion-promoting agent promotes adhesion between the barrier resin and the polyester resin.

BRIEF DESCRIPTION OF SEVERAL VIEWS OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

DETAILED DESCRIPTION OF THE INVENTION

Figure 1:
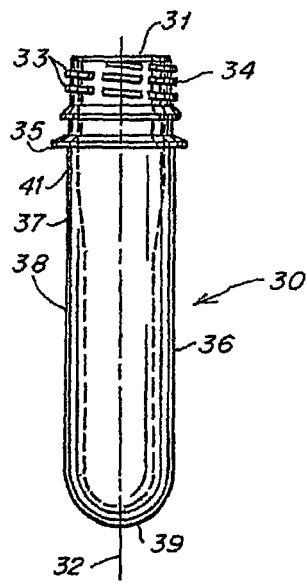
FIG. 1 is a side elevational view of a multi-layer preform incorporating two layers of an enhanced scavenging polymer according to one embodiment of the present invention.

The present invention provides a delamination-resistant multilayer plastic bottle, preform or article including an adhesion-promoting agent and an oxygen barrier composition in the multilayer wall. The wall has several layers including at least one layer of a polyester matrix resin and at least one layer of a barrier resin.

Polyester Containers/Bottles

The at least one layer of a polyester matrix resin is typically employed for forming an outermost layer, an innermost layer and optionally at least a part of an intermediate layer of the multilayer bottle according to the present invention. Suitable polyester resins are obtained by polymerizing a dicarboxylic acid component containing terephthalic acid in an amount of 80 mol % or more and preferably 90 mol % or more (inclusive of 100 mol %) with a diol component containing ethylene glycol in an amount of 80 mol % or more and preferably 90 mol % or more (inclusive of 100 mol %).

Examples of dicarboxylic acids that may be contained in the dicarboxylic acid component include isophthalic acid, diphenyl ether-4,4-dicarboxylic acid, naphthalene-1,4-dicarboxylic acid, naphthalene-2,6-dicarboxylic acid, adipic acid, sebacic acid, decane-1,10-dicarboxylic acid and hexahydroterephthalic acid. Examples of diols that may be contained in the diol component include propylene glycol, 1,4-butanediol, neopentyl glycol, diethylene glycol, cyclohexane dimethanol, 2,2-bis(4-hydroxyphenyl)propane and 2,2-bis(4-hydroxyethoxyphenyl)propane.

The preferred polyester matrix resin for use in accordance with the present invention is polyethylene terephthalate (PET) because PET has excellent properties for use as a bottle/container, including transparency, mechanical strength, injection moldability and stretch blow moldability.

The polyester matrix resin preferably has an intrinsic viscosity (IV) of from 0.55 to 1.30, and more preferably from 0.65 to 1.20. When the polyester has an intrinsic viscosity of 0.55 or more, it is possible to produce not only a transparent amorphous multilayer preform but also a multilayer bottle having a satisfactory mechanical strength.

Further, the polyester matrix resin from which the outermost or innermost layer of the multilayer bottle is mainly formed may also be blended with other thermoplastic resins or various additives unless the addition thereof adversely affects the intended end use application of the present invention. The outermost or innermost layer preferably contains the polyester in an amount of 90% by weight or more (inclusive of 100% by weight). Examples of the other thermoplastic resins include thermoplastic polyester resins such as polyethylene-2,6-naphthalenedicarboxylate, polyolefin-based resins, polycarbonates, polyacrylonitrile, polyvinyl chloride and polystyrene. Examples of the additives include ultraviolet absorbers, oxygen absorbers, colorants, other blended barrier resins, acetaldehyde reducers, and infrared absorbers (reheating additives) for accelerating heating of the preform and shortening a cycle time upon molding.

Barrier Resin Layer

The multilayer bottle of the present invention includes at least one layer of an oxygen barrier resin that comprises a polyamide and is intermediate relative to the inner and outermost layer of the polyester matrix resin.

The oxygen transmission rate (OTR) of the barrier layer formed in the multilayer bottle of the present invention as measured at a temperature of 23° C. and a relative humidity (RH) of 60% is preferably 0.2 ccmm/(m² day atm) or less, more preferably 0.15 cc mm/(m² day atm) or less, still more preferably 0.10 cc mm/(m² day atm) or less and further still more preferably 0.08 cc mm/(m² day atm) or less on the average. When the OTR of the barrier layer lies within the above-specified range, the obtained multilayer bottle exhibits a good gas-barrier property and is capable of prolonging a consumable date of contents to be preserved therein.

In the multilayer bottle of the present invention, the barrier layer preferably comprises a polymer that has a repeat unit including an amide group, also known as a polyamide. An amide is defined as having a unit —RN—C(O)— where R can be hydrogen, alkyl or aryl. In a preferred embodiment, the polyamide is a nylon where the backbone includes aromatic and/or aliphatic groups derived from the polycondensation of an aralkylene diamine with linear aliphatic or aromatic dicarboxylic acid monomers and is represented by the structure of formula III:

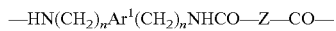

wherein n=1-3, $Ar^1$ is a substituted or unsubstituted arylene group such as, for example, an m- or p-phenylene group, and Z=a $C_4$ to $C_8$ alkylene group or an unsubstituted $C_6$ to $C_{14}$ arylene group such as, for example, phenylene, naphthylene, biphenylene, anthracenylene or phenanthrenylene.

Examples include PA-MXD6 (e.g., Grades 6001, 6007 and 6121), nylon 6, or nylon 6,6, MXD6/T, and MXD6/66. In a preferred embodiment, the backbone includes aromatic groups derived from xylidene monomers which include m-xylidene, i.e., MXD-polyamides. One example of an MXD-polyamide can be formed by polymerizing meta-xylylene-diamine ($H_2NCH_2$-m-$C_6H_4$—$CH_2NH_2$) with adipic acid ($HO_2C(CH_2)_4CO_2H$), to produce the polymer MXD6 (sold by Mitsubishi Gas Chemicals, Japan). Another example of an aromatic polyamide is obtained by the polymerization of meta-xylilene-diamine and adipic acid (same as PA-MXD6) but with the addition of 11 mole percent isophthalic acid ($C_6H_4$—$(COOH)_2$). This polymer is sold by EMS of Domat/EMS, Switzerland. An example of an aliphatic polyamide is nylon-6 (PA 6). Typically, amorphous polyamides have a $T_g$ of from 90° C. and 150° C. The preferred polyamide for use in the barrier layer of the multilayer bottles of the present invention is PA-MXD6—either alone or as a component of a blend with another polyamide.

The above preferred polyamide polymer may optionally be blended with minor amounts of other polyamides for cost or processability benefits. Examples of other polyamides include, for example, poly(hexamethylene isophthalamide-co-terephthalamide) (PA-6,I/6,T), poly (hexamethylene isophthalamide) (PA-6I) and other such polyamides abbreviated as, PA-MXDI, PA-6/MXDI, PA-6/6N and the like. PA-6I/6T is commercially available from EMS corporation of Zurich, Switzerland, under the name Grivory™ G21, or from DuPont of Wilmington, Del., USA, under the name Selar™ PA3426 or Selar PA2072.

As detailed above, the barrier layer can be "passive" or "active" in it's barrier properties to oxygen. Each of the above-mentioned polyamides or blends thereof are typically regarded as excellent passive barriers, however, each has the capability of becoming an "active" barrier layer, i.e., an oxygen-scavenging layer, upon mixture with a transition metal as described herein (also referred to herein as an "oxygen scavenger").

The oxygen-scavenging performance of the polyamide polymers depends on the presence of a metal. The metal can be added in the form of the metal itself, as a salt or as a metal compound. In a preferred embodiment, the oxygen-scavenger comprises a polyamide polymer and a metal where the metal is added as a metal compound. Metal compounds typically comprise two components: a metal and a ligand which bonds to the metal and generally a substantial portion of the ligand is organic.

In one embodiment, the metal can be added to the polyamide polymer as a liquid, a solution mixture, in a crystalline form, as a pastille, or as a powder depending on factors such as processing conditions. Typically, the metal is mixed with the polyamide polymer to create a physical blend. The oxygen-scavenger, however, can eventually comprise a chemical bond between the metal and the scavenger or the ligand of the metal compound and the scavenger where a chemical reaction occurs in the physical blend of the metal compound and the scavenging polyamide polymer. In other words, once the metal compound is processed with a polyamide polymer, the metal compound can be present in the oxygen-scavenging polyamide polymer as the same initial metal compound, a new metal compound, a salt or a metal atom. A new metal compound can occur where at least a portion of the ligand no longer forms a chemical bond with the metal and a new ligand bonds to the metal. The new ligand can be the oxygen-scavenging polyamide polymer, or any other components such as water, or any other organic component such as an organic component that results as a by-product of scavenging polyamide polymer degradation. Preferably, the initial metal compound is available in a stable form, i.e., the metal compound is unreactive towards oxygen before addition of the compound to the oxygen-scavenging polymer.

The amount of metal present in the polymer is defined relative to the amount by weight in the polyamide polymer. It is understood that the desired metal concentration can depend on a variety of factors or a combination of these factors such as molecular weight of the metal, molecular weight of the entire metal compound, polymer type or molecular weight of the polyamide polymer. In one embodiment, the metal (e.g., cobalt) is present in an amount of at least 200 ppm based on the scavenging polyamide polymer, more preferably from 200 ppm to 2000 ppm, even more preferably from 300 ppm to 1000 ppm, and still more preferably from 400 ppm to 800 ppm. The lower limits of the metal concentration may be determined by a desired level of oxygen-scavenging performance (i.e., insufficient concentrations of metal may not achieve a desired scavenging performance for a given application) and processability. The upper limit may be determined by factors such as cost, toxicity, transparency, color, or processability, depending on the particular application.

In one embodiment, the polyamide polymer is solid-stated in the presence of the metal as described in U.S. patent application Publication No. 2008/0153939. In another embodiment, the metal is added to (i.e., blended with) the polyamide polymer. Preferably, the metal is added in a manner to prevent the incorporation of excess oxygen and water to the polyamide polymer. Thus, the metal in solid form (e.g., powder, pellets, pastilles) can be dry tumbled in a sealed container with the polyamide polymer. During a tumbling or agitation process, the polyamide polymer and metal can be heated, and the heating step can be coupled with subjecting the polyamide polymer and metal to a vacuum. This heating step can facilitate uniform distribution of the metal about the polyamide polymer, and further enhances the scavenging performance. The temperature of this optional heating step is less than the temperature that would cause decomposition of the metal and polyamide polymer and more preferably less than the polyamide polymer's $T_g$. For example, when combining a nylon (such as MXD-6) and cobalt, this temperature is no greater than 130° C. and more preferably no greater than 70° C.

In one embodiment, the metal is a transition metal. The transition metal can be selected from the group consisting of iron, cobalt, nickel, ruthenium, rhodium, palladium, osmium, iridium, platinum, copper, manganese and zinc. In a preferred embodiment, the metal is cobalt and more preferably is added as a cobalt carboxylate compound. One example of a cobalt carboxylate compound is cobalt neodecanoate.

Adhesion-Promoting Agent

In a situation as described herein where a polyester matrix layer is positioned adjacent a polyamide-containing barrier layer (whether oxygen-scavenging or not) in the absence of an adhesive, it is preferable that the two layers be "compatible." Compatibility implies that the multi-layer article, having at least two layers positioned adjacent each other, have the structural integrity to withstand delamination, observable deformation from a desired shape, or any kind of degradation of a layer caused by a chemical or other process initiated by an adjacent layer during, the article-forming process or in the final product during expected use. The present inventors have surprisingly discovered that compatibility can be significantly enhanced by blending an adhesion promoting agent either with the polyamide barrier polymer and/or with the polyester resin prior to co-injecting the polymers to form a preform as discussed in more detail below.

An adhesion promoting agent according to the present invention is at least one thermoplastic polymer selected from either formula I or formula II:

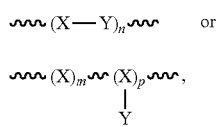

wherein X is a polyamide-compatible oligomeric or polymeric moiety; Y is a polyester-compatible oligomeric or polymeric moiety; n is an integer from 1 to 100; and m and p represent the mole fractions of the respective parts such that m+p=1. Thus, regarding the structure of formula II, only a portion of the polymer X moiety may be grafted with a pendant Y moiety. Preferably, p=0.1-0.5. Regarding formula I, when n=1 the polymer is a diblock copolymer and when n>1 it is a segmented block copolymer, such as is the case with a polyester TPU. As used herein, the term "compatible" means the capability of individual components of a blend exhibiting interfacial adhesion due to favorable attractive molecular interactions. The degree of compatibility is a measure of the strength of interfacial bonding. See e.g., the following reference paper on IUPAC definitions: W. J. Work et. al, Pure. Appl. Chem., v. 76, 1985 (2004).

Thus, the term "polyamide-compatible oligomeric or polymeric moiety" means that a material with such a moiety exhibits favorable molecular interaction and interfacial adhesion when mixed with a polyamide such as PA-MXD6. A polyamide-compatible moiety can be miscible or partially miscible at segmental level with polyamides but it must at least exhibit good interfacial bonding. Generally a polyamide compatible moiety contains functionalities in its structure capable of hydrogen bonding, e.g., hydroxyl groups (—OH), urethane groups (—OCONH—), urea groups (—NHCONH—), amide groups (—CONH—) or sulfonamide groups (—SO$_2$NH—).

Likewise, the term "polyester-compatible oligomeric or polymeric moiety" means that a material with such a moiety exhibits favorable molecular interaction and interfacial adhesion when mixed with a polyester such as PET. A polyester compatible moiety may be miscible or partially miscible at segmental level with PET, but it must at least exhibit good interfacial adhesion and bonding. Generally a polyester compatible moiety contains functionalities in its structure capable of Vanderwal-type molecular interaction with the aromatic ester group of PET, e.g., aliphatic or aromatic ester groups (—COO—), aliphatic or aromatic ether groups (—O—), keto groups (—CO—), etc.

In some embodiments of the present invention, X is a phenoxy moiety represented by the structure:

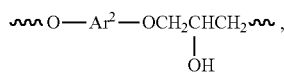

wherein Ar$^2$ is an arylene selected from the group consisting of: m- or p-phenylene, bisphenol A, biphenylene, and 4,4'-diphenylene.

In other embodiments of the present invention, X is a polyurethane moiety represented by a general structure of:

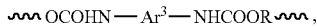

wherein Ar$^3$ is an arylene group selected from the group consisting of: m-phenylene, m-xylylene, 4,4' biphenylene, and methylene-bis-4,4'diphenylene.

In some embodiments of the present invention, Y can be a polyester moiety represented by the structure:

wherein p is an integer from 1-6; and q is an integer from 1-12.

In other embodiments of the present invention, Y can be a polyether moiety represented by the structure:

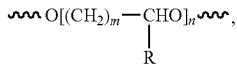

wherein R is H or alkyl; m is an integer from 1-3; and n>10.

In preferred embodiments of the present invention, X is a polyurethane, a polyhydroxy ether (e.g., a phenoxy ether), or a polyamide group. A more detailed description of the preferred embodiments of the adhesion-promoting agent according to the present invention is provided herewith, which includes polyester TPUs, polyether TPUs, polyester-grafted phenoxy resins, and polyester-polyamide graft co-polymers.

Polyester TPU

When X is a polyurethane moiety, in other preferred embodiments the adhesion-promoting agent/polymer comprises a thermoplastic polyurethane segment ("TPU") and a polyester segment. The preferred polyester TPU adhesion-promoting agents for use in accordance with the present invention are segmented block copolymer type polyurethanes made from the polyaddition reaction of (a) a linear polyester polyol or diol and (b) an organic diisocyanate and (c) a short chain glycol as chain extender. The polyester diol forms the "soft" segment of the TPU polymer while the diisocyanate and the chain extender form the "hard" segments.

Preferred polyester diols for use as the Y portion of the adhesion-promoting agent of the present invention are linear polyester with terminal hydroxyl groups having a molecular weight (Mn) of from about 500 to about 5,000. They are typically produced by (a) an esterification reaction of glycols with dicarboxylic acids or (b) by a transesterification reaction of glycols with dimethyl esters of dicarboxylic acids or (c) by a ring opening polymerization of cyclic lactones such as caprolactone with a bifunctional initiator such as diethylene glycol. The dicarboxylic acid monomers used in making polyester diols are typically C$_4$-C$_{12}$ aliphatic dicarboxylic acids such as, for example, adipic, azelaic and sebacic acid. Adipic acid is the most preferred. The glycol monomers used are typically C$_2$-C$_{12}$ aliphatic glycols such as, for example, ethylene glycol, diethylene glycol, 1,3-propanediol, 1,4-butanediol, 1,5-pentanediol, 1,6-hexanediol, neopentyl glycol etc. Ethylene glycol, and 1,4-butanediol are the most preferred glycols. Poly(ethylene adipate), poly (butylenes adipate), and polycaprolactone are the most preferred polyester-diols.

The organic diisocyanate used in the polyester TPUs according to the present invention can be aromatic, cycloaliphatic, or aliphatic. Examples of aromatic diisocyanates include diphenyl methane-4,4'-diisocyanate (MDI), m-xylylene diisocyanate (MXDI), tetramethyl m-xylylene diisocyanate (TMXDI), toluene 2,4/2,6-diisocyanate (TDI) etc. Examples of aliphatic diisocyanates include isophorone diisocyanate (IPDI) and hexamethylene diisocyanate (HDI).

The chain extenders used in forming the hard segments of such TPU polymers are short chain glycols such as, for example, ethylene glycol, 1,4-butanediol, and 1,6-hexanediol. The most common chain extender is 1,4-butanediol.

In one embodiment, a polyester TPU for use in accordance with the present invention is prepared by reacting the above three ingredients (i.e., polyester polyol, diisocyanate, and the glycol chain extender) in the presence of a suitable catalyst such as, for example, dibutyltin dilaurate to form the polyester TPU by any of the conventional polymerization methods such as bisphenol A with epichlorohydrin and they contain pendant hydroxyl groups in the repeat units of the polymer backbone.

When such phenoxy resins are further reacted with caprolactone, in the presence of a catalyst, as disclosed in U.S. Pat. No. 4,559,247, a portion of these pendant hydroxyl groups react to form polycaprolactone short chain grafts. Such caprolactone modified phenoxy resins are commercially available from Inchem (Hunting Valley, Ohio) as PKCP resins. These short chain polyester grafted phenoxy resins have been found to be more effective and useful than the unmodified phenoxy resin as adhesion promoting compatibilizer in the multilayer PET-barrier polyamide containers of the present invention. It is believed that the pendant OH groups of phenoxy provide the hydrogen bonding compatibility with the polyamide, while the pendant polyester grafts provide compatibility with the PET:

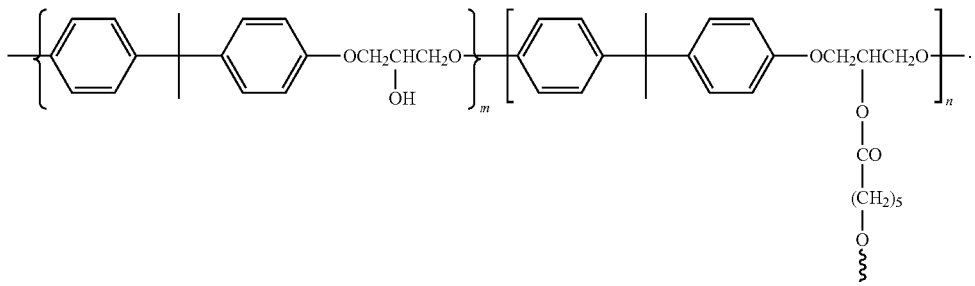

known in the art. For example, the polyester TPUs may be produced either in a 2-stage process (prepolymer method) or by the simultaneous reaction of all the components in one step (one shot method). In the former, a prepolymer from the polyester diol and diisocyanate is first formed and then reacted with the chain extender.

Preferred polyester TPU's include, for example, TPUs selected from the thermoplastic polyester polyurethanes derived from the reaction of poly(tetramethylene adipate) diols and the diphenylmethane, 4,4'-diisocyanate (MDI), commercially available as Estane® TPU resin grades such as ETE60DS3 or 58271, from Lubrizol Advanced Materials Inc.
Polyether TPU Polyether TPUs may also be used as adhesion-promoting agents according to the present invention. Polyether TPUs are made by methods similar to the above-described polyester TPUs, except that a polyether polyol or diol is used as the raw material instead of polyester diol. The polyether diols typically range in MW of from 400-4000. Useful commercial polyether diols for TPU preparation include poly(ethylene glycol) (PEG) comprising poly (oxyethylene) backbone with terminal hydroxyl groups, poly(propylene glycol) (PPG) comprising poly (oxypropylene) backbone with terminal hydroxyl groups, and poly(tetramethylene ether glycol) (PT-MEG) comprising poly(oxytetramethylene) backbone with terminal hydroxyl groups.
Polyester Grafted Phenoxy Resin In another embodiment, the X portion of the thermoplastic polymer of formula I and formula II comprises at least one phenoxy group. Thermoplastic hydroxy-alkoxy-phenoxy polyether resins, such as those disclosed in U.S. Pat. No. 3,356,646 are commonly known as 'Phenoxy' resins. They are the polymerization reaction products of dihydric phenols Preferred polyester grafted phenoxy resins include, for example, polycaprolactone modified phenoxy resins such as InchemRez PKCP-80 commercially available from Inchem Corporation.
Polyester-Polyamide Craft Copolymers:

In another embodiment, the X portion of the thermoplastic polymer of formula I and formula II comprises at least one polyamide group having any of the structures of formulas IV to VII:

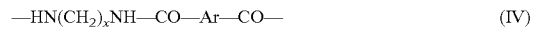

where x=4-12 and where Ar is a divalent aromatic residue such as m, or p-phenylene, substituted phenylene, 2,6-napthylene etc.

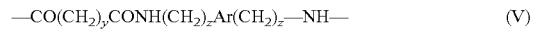

where y=2-12; z=1-2 and Ar is a divalent aromatic residue such as o-, m, or p-phenylene, substituted phenylene, 2,6-napthylene and the like

or

where p, q, and r are independently integers ranging from 2-12.

Polyester-polyamide graft copolymers can be made by reactive coupling between the amine end groups of polyamide and the carboxylic acid end groups of polyester by using a suitable organophosphite such as triphenyl phosphate as disclosed in U.S. Pat. No. 4,963,311. Such graft copolymers are, suitable for use as an adhesion-promoting agent for promoting adhesion in multilayer PET/barrier polyamide containers of this invention. The preferred additive is a graft copolymer of PET or a copolyester such as PETG and a barrier polyamide such as PA-MXD6 or PA-MXD6/I copolymer.

It is preferred that the adhesion-promoting material be blended with the barrier resin. Because the barrier resin layers form a relatively small percentage by weight of the overall preform or container, a lesser quantity of adhesion-promoting material is required than if the adhesion-promoting material is blended with the matrix resin. However, the adhesion-promoting material could be blended with the matrix resin, or with both the matrix resin and the barrier resin.

The amount of adhesion-promoting resin preferably is no more than what is necessary to achieve the desired level of adhesion, as increasing the proportion of adhesion-promoting material may affect the viscosity or other properties of the resin with which it is blended. The amount of adhesion-promoting material blended with the barrier resin or the matrix resin preferably does not exceed about 15%, and more preferably does not exceed about 10% by weight of the blend, and most preferably does not exceed about 7% by weight used to form the multilayer article. In this regard, the adhesion-promoting material preferably is blended with a barrier resin, and preferably does not exceed about 10% by weight of the blend. The amount of adhesion-promoting material more preferably does not exceed about 7% by weight of the blend with the barrier resin used to form the multilayer articles. In many applications, the amount of the adhesion-promoting material does not exceed about 5% by weight of the blend with the barrier resin. All blend percentages in this application are by weight unless otherwise indicated.

Packages and Multi-Layer Articles

Packages of the present invention include articles for storing food or other products; the package can be a blow-molded container, an injection-molded container, and a film (e.g., for wrapping meat, vegetables, and fruit). The intended application will dictate the desired package characteristics; for example, a film for wrapping food will not have the same rigidity requirements as a plastic bottle. However, the film thickness may be greater than typical (for non-scavenging applications) in order to provide the desired scavenging performance.

The thicknesses of the barrier (i.e., either passive or active scavenging) containing the adhesion-promoting agent (herein referred to simply as the "barrier layer") and structural polyester layers (also referred to herein as "structural layers") will generally effect the oxygen-scavenging performance of the package. Generally, multi-layer articles comprising an active barrier layer having thicker scavenging layers result in a better scavenging performance. Other factors however, may provide an upper limit to scavenging layer thickness. For example, in commercial applications it is generally desired that the cost of the oxygen-scavenging layer be minimized. The cost of incorporating a polyamide into a multi-layer container can be significant compared to a container made solely of polyethylene terephthalate. The methods and articles of the present invention can be used to achieve a cost reduction by, for example, providing one or more relatively thin barrier layers (compared to the overall thickness of the article). In one embodiment, by using, for example, separate oxygen-scavenging layers as opposed to blends (of the scavenger and other polymers), thinner oxygen-scavenging layers may be used with thicker structural layers and subsequently cost is minimized while processing conditions and/or final bottle characteristics are optimized. Where the barrier layer includes a metal, a relatively high concentration of metal can be incorporated in such layer. In contrast, a blend will typically have a lower concentration of metal spread over a thicker layer (but have a higher metal concentration in the overall package).

Where the barrier layer is an oxygen scavenging layer, it has been found that for some applications optimizing the amount of metal and oxygen-scavenging polymer in a relatively thinner portion of an article optimizes the oxygen-scavenging performance. For example, when two thin intermediate layers of an oxygen-scavenging polymer are incorporated in a 5-layer injection molded preform for making a bottle, as described hereinafter, where the scavenging layers comprise a polyamide and cobalt, if the amount of cobalt is greater than 1000 ppm (based on the polyamide weight) and/or the weight of the scavenging polymer in the preform is no greater than 10% by weight, it may be difficult to provide a desired concentration of cobalt and/or amount of oxygen-scavenging polymer in the relatively thin sidewall portion of the container. One reason for this is that cobalt will decrease the IV of the polyamide, thereby affecting the material distribution of the layers during injection. Thus, depending on the scavenger used, the composition of adjacent layers, the thicknesses of the various layers, and the processing technique (simultaneous injection molding, sequential injection molding, extrusion, film-forming, etc.), there may be upper and/or lower limits on the amount of metal used while attempting to achieve a desired oxygen-scavenging performance.

In general, the thicknesses of the barrier/structural layers are preferably selected to allow the bottle to have a substantial storage period unfilled and a reasonable rate of protection from oxygen when filled, both factors being tailored to the particular food product being stored. For example, in a multilayer scavenging container, the outer layers should be thick enough to prevent oxygen permeating to the scavenging layer in an amount in excess of that which can be removed by the scavenger. The thickness of the inner structural layer (i.e., the layer closest to the food product) must also be thin enough to allow the enclosed oxygen content, often having a low partial pressure of oxygen, to permeate the inner layer at a commercially acceptable rate allowing for reduction of the oxygen content. The more active the oxygen scavenger, the less thickness required of the structural layer. Those skilled in the art will appreciate that structural layers that are too thin may reduce the storage period to unacceptable levels.

In a preferred embodiment described below, the multi-layer article can be used as a package, where the package contains a product that requires storage under low oxygen conditions. For example, the product can be a food or beverage (e.g., beer, juice, and ketchup) and the multi-layer article can be a bottle having an opening that can be sealed with a standard cap. The product can include a pressurized liquid, e.g., by carbon dioxide or nitrogen, wherein the container maintains the product pressure and maintains a low oxygen content.

Typically, a multi-layer container such as a bottle is a blow-molded article made from an injection-molded multi-layer preform. The preform may comprise a neck finish, a sidewall-forming portion and a base-forming portion. The multiple layers of the preform can be formed by any method known in the art. In one embodiment, the multi-layer preform can be formed by applying or injecting various materials individually (sequentially) into a mold. In another embodiment, the multi-layer preform can be formed by simultaneous injection of the desired layers into the mold. Yet in another embodiment, where the container is a film for wrapping food, the multi-layer can be formed by co-extruding multi-layer sheets. Certain techniques encompassed by at least some of these various embodiments for forming multi-layer articles are described in U.S. Pat. No. 5,281,360, U.S. Pat. No. 5,032,341, and U.S. Pat. No. 4,609,516.

In general, the multilayer preform may be blow-molded by conventionally known methods such as a so-called cold parison method and a so-called hot parison method. In the cold parison method, a preform having been injection molded is stocked, and heated and stretch blown later on by a stretch blowing apparatus. In the hot parison method, an injection apparatus and a stretch blowing apparatus are provided in the same molding apparatus, and in which a preform having been injection molded is stretch blown while it possesses heat therein. In each case, after heating a surface of the multilayer preform to a temperature of 80 to 120° C., the multilayer preform is stretched in an axial direction thereof by a mechanical means such as a core rod insertion, and then a high-pressure air usually pressurized to from 2 to 4 MPa (400-700 psi) is blown into the multilayer preform to subject the preform to stretching and blow molding in a lateral direction thereof.

In a preferred embodiment, the preform has a particular multi-layer arrangement such that when the preform is formed into a bottle, a significant portion of the barrier layer is contained in the thinnest portion of the bottle, namely the sidewall. In some applications, substantially the entire container body (below the neck finish) includes a layer of the barrier resin. As previously discussed, it has been found that the choice of polymers and polymer processing conditions can affect the location of a significant portion of the barrier layer.

In a preferred embodiment of the present invention, the multilayer container is a 5-layer b bottle wherein the bottle has two intermediate oxygen-scavenging layers (polyamide MXD6/cobalt/adhesion-promoting agent) positioned between inner, core, and outer structural polymer layers (PET)—see, for example, the 5-layer bottle of FIGS. 1 to 4 described below. Typically, the neck finish and/or base of the container will have a thicker structural layer. Where a portion of the container has a thicker structural layer, a lesser thickness of the scavenger layer (than in the other bottle portions) may prove to be adequate. In the 5-layer embodiment, the oxygen-scavenging polymer/layer is preferably no greater than 15% by weight of the bottle, while providing sufficient scavenger in the sidewall for a desired performance. Preferably, from a cost perspective, the weight percentage of the scavenger is no greater than 10%, e.g., 5-8%. In some applications, the scavenger could be 2-5% by weight.

In a 5-layer beverage bottle application as described herein, a thickness of each of two oxygen-scavenging layers in the sidewall-forming portion of the preform is preferably from 0.001 to 0.01 in. (0.0254 mm to 0.254 mm), and more preferably from 0.004 to 0.005 in. (0.102 mm to 0.127 mm). A total thickness of the preform is preferably from 0.1 to 0.3 in. (2.54 mm to 5.08 mm), and more preferably from 0.14 to 0.17 in. (3.56 mm to 4.32 mm). The thickness of each structural polymer layer (inner, core, outer) is preferably from 0.01 to 0.1 in. (0.254 mm to 2.54 mm), and more preferably from 0.03 to 0.08 in. (0.762 mm to 2.03 mm). Alternatively, the two scavenger layers may be combined into a single scavenger layer in the sidewall (at double the thickness of one scavenger layer).

The resulting bottles (of the 5-layer embodiment) preferably have an average sidewall thickness from 0.01 to 0.02 in. (0.254 mm to 0.508 mm). Each of the two oxygen-scavenging layers in the sidewall has a thickness of preferably from 0.0001 to 0.001 in. (0.00254 mm to 0.0254 mm), and more preferably from 0.0004 to 0.0006 in. (0.0102 mm to 0.0152 mm). Each structural polymer layer (inner, core, outer) in the sidewall preferably has a thickness of from 0.001 to 0.02 in. (0.0254 mm to 0.0508 mm), and more preferably from 0.003 to 0.008 in. (0.0762 mm to 0.203 mm). Again, as an alternative, the two separate scavenger layers can be combined into one (at double the thickness).

Enhanced Scavenging and Delamination Resistant Beer Bottle

FIGS. 1 to 4 illustrate a transparent 5-layer preform and beer container including two oxygen-scavenging polymer layers comprising an adhesion-promoting agent according to the present invention. This multi-layer structure enables use of a relatively low-weight percentage of the scavenging polymer, e.g., about 7½ percent of the total container weight, while providing a high level of scavenging.

An injection-molded multi-layer preform 30 is shown in FIG. 1. The preform is substantially cylindrical, as defined by vertical centerline 32, and includes an upper neck portion or finish 34 integral with a lower body-forming portion 36. The neck portion has a top sealing surface 31 which defines an open top end of the preform, and a generally cylindrical exterior surface with threads 33 and a lowermost flange 35. Below the flange is the body-forming portion 36 which includes an upper cylindrical portion 41, a flared shoulder-forming portion 37 which increases radially inwardly in wall thickness from top to bottom, a cylindrical panel-forming section 38 having a substantially uniform wall thickness, and a substantially hemispherical base-forming section 39.

Preform 30 has a three-material, five-layer (3M, 5 L) structure (not shown in FIG. 1) and is substantially amorphous and transparent. The multiple preform layers comprise, in serial order: (1) an outer layer of virgin PET, (2) an outer intermediate layer of an active barrier composition comprising MXD6, 500 ppm cobalt (per weight of MXD6 and added as cobalt neodecanoate), and 5% of an adhesion promoter of the present invention, (3) a central core layer of recycled PET, (4) an inner intermediate layer of the active barrier composition of layer (2), and (5) an inner layer of virgin PET. The virgin PET may be any commercially available, bottle-grade PET homopolymer or copolymer. The core layer is typically commercially available post-consumer PET. The MXD6 in the two intermediate layers is preferably solid-stated as described in U.S. patent application Publication No. 2008/0153939, having an intrinsic viscosity for example of 1.27 dl/g, a $T_9$ of 87° C., and a melting point of 238° C.

Figure 2:
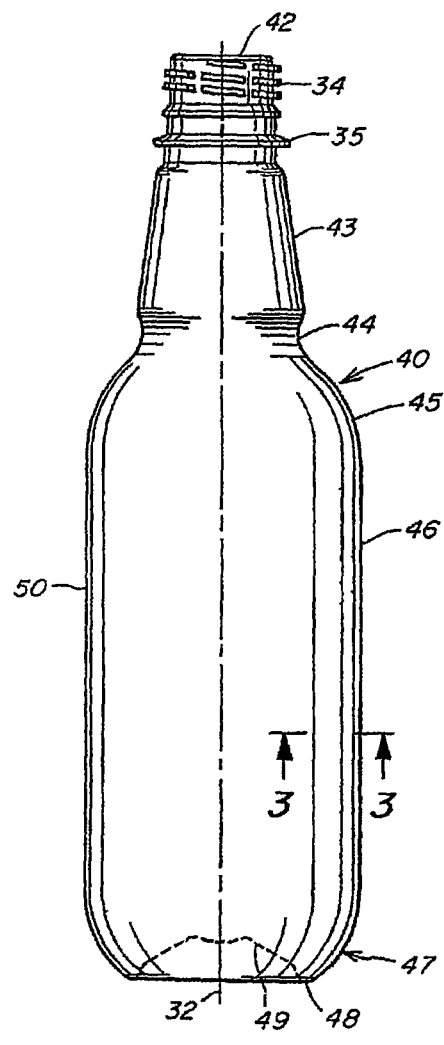
FIG. 2 is a side elevational view of a multi-layer container having a transparent sidewall made from the preform of FIG. 1.

The preform 30 is adapted for making a 0.5 liter (500 ml) pressurized container for beer, as shown in FIG. 2. The preform 30 has a height of about 112 mm, and an outer diameter in the panel-forming section 38 of about 25 mm. The total wall thickness of the panel-forming section 38 is about 4 mm; the thickness of the various layers in this preform section are: outer and inner layers each about 1.1 mm thick; inner and outer intermediate layers each about 0.11 mm thick; and core layer about 1.6 mm thick. For carbonated beverage containers of about 0.3 to 1.5 liters in volume, having a panel wall thickness of about 0.25 to about 0.38 mm, and filled at about 2.0 to 4.0 volumes of $CO_2$ aqueous solution, the preform panel-forming section 38 preferably undergoes an average planar stretch ratio of about 9-12. The planar stretch ratio is the ratio of the average thickness of the preform panel-forming portion 38 to the average thickness of the container panel 46 (as shown in FIG. 2); the average is taken along the length of the respective preform and container portions. The average panel hoop-stretch is preferably about 4.0 to 4.5, and the average panel axial stretch is about 2 to 3. This produces a container panel 46 with the desired biaxial orientation and visual transparency. The specific panel thickness and stretch ratio selected depend on the dimensions of the bottle, the internal pressure, and the processing characteristics (as determined for example by the intrinsic viscosity of the particular materials employed).

The preform shown in FIG. 1 may be injection molded by a sequential metered process described in U.S. Pat. Nos. 4,550,043; 4,609,516; 4,710,118; 4,781,954; 4,990,301; 5,049,345; 5,098,274; and 5,582,788, and hereby incorporated by reference in their entirety. In this process, predetermined amounts of the various materials are introduced into the gate of the preform mold as follows: a first shot of virgin PET which forms partially-solidified inner and outer preform layers as it moves up the cool outer mold and core walls; a second shot of the scavenging polymer which will form the inner and outer intermediate layers; and a third shot of the recycled PET material which pushes the scavenging polymer up the sidewall (to form thin scavenging layers) while the third slot forms a central core layer. A final shot of virgin PET may be used to clear the nozzle and finish the bottom of the preform with virgin PET.

After the mold is filled, the pressure is increased to pack the mold against shrinkage of the preform. After packing, the mold pressure is partially reduced and held while the preform cools. In a standard process, each of the polymer melts are injected into the mold at a rate of about 10-12 grams per second; a packing pressure of about 7500 psi ($50 \times 10^6$ $Nm^{-2}$) is applied for about 4 seconds after filling; the pressure is then dropped to about 4500 psi ($30 \times 10^6$ $Nm^{-2}$) and held for the next 15 seconds, after which the pressure is released and the preform is ejected from the mold. Increasing the pressure above these levels may force higher levels of interlayer bonding, which may include chain entanglement, hydrogen bonding, low-level interlayer crystallization and layer penetration; these may be useful in particular applications to increase the resistance to layer separation in both the preform and container. In addition, increased pressure holds the preform against the cold mold walls to solidify the preform without haze, i.e., loss of transparency, at the minimum possible cycle time. Still further, faster injection rates may yield higher melt temperatures within the injection cavity, resulting in increased polymer mobility which improves migration and entanglement during the enhanced pressure portion of the injection cycle, and thus increases the delamination resistance. As an additional option, increasing the average preform temperature and/or decreasing the temperature gradient through the preform wall may further reduce layer separation by minimizing shear at the layer boundaries during preform expansion.

Figure 4:
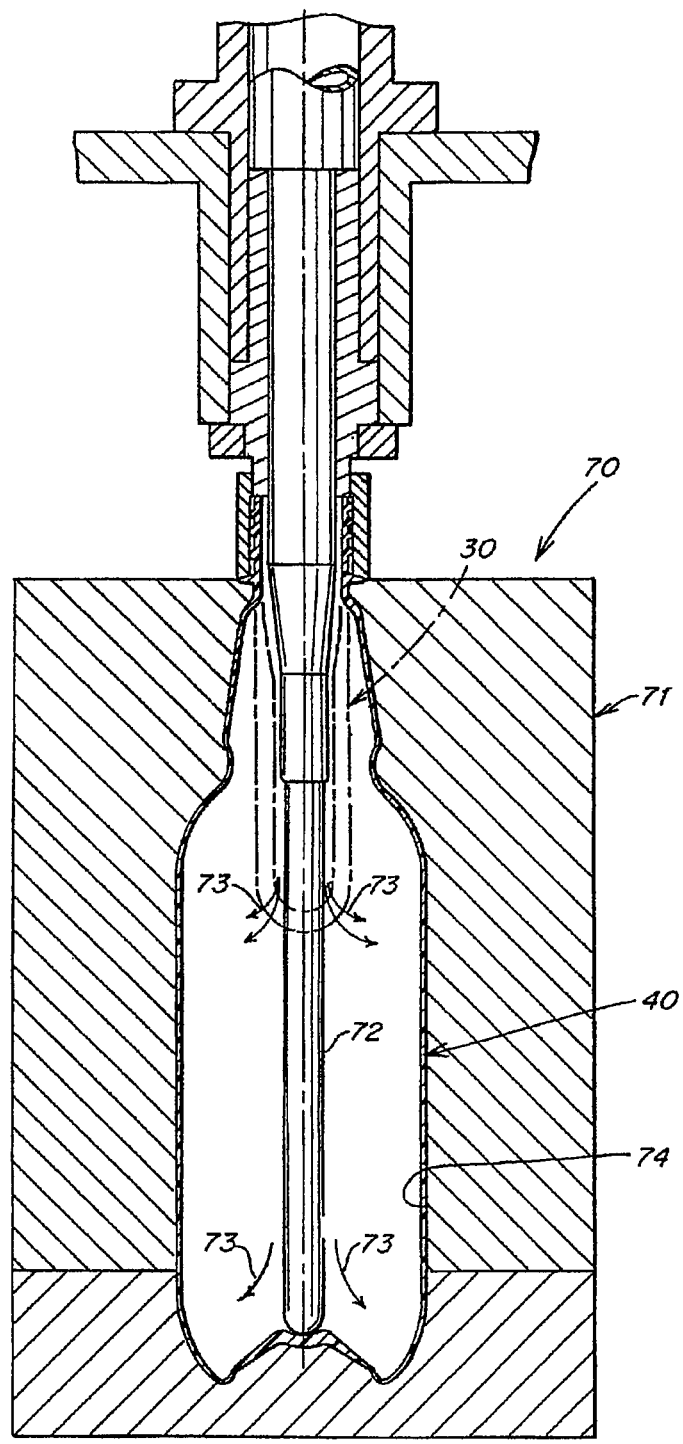
FIG. 4 is a vertical cross-section of a blow molding apparatus for making the container of FIG. 3.

FIG. 4 illustrates a stretch blow-molding apparatus 70 for making the container 40 from the preform 30. More specifically, the substantially amorphous and transparent preform body-forming section 36 is reheated to a temperature above the glass transition temperatures ($T_g$) of the inner/outer virgin PET, intermediate scavenger, and core recycled PET layers, and the heated preform then positioned in a blow mold 71. A stretch rod 72 axially elongates (stretches) the preform within the blow mold to insure complete axial elongation and centering of the preform. A blowing gas (shown by arrows 73) is introduced to radially inflate the preform to match the configuration of an inner molding surface 74 of the blow mold. The formed container remains substantially transparent but has undergone strain-induced biaxial orientation to provide the increased strength necessary to withstand the carbonation pressure.

In this embodiment the preforms are reheat stretch blow-molded on a Sidel SBO-1 into 500 ml beer bottles with an average sidewall thickness of 0.015 in. In the sidewall, the inner PET layer is 0.0037 in. thick, the inner intermediate layer is 0.0005 in., the core layer is 0.0065 in., the outer intermediate layer is 0.0005 in., and the outer layer is 0.0038 in. thick.

FIG. 2 shows the 0.5 liter multi-layer beverage bottle 40 made from the preform of FIG. 1. The preform body-forming portion 36 has been expanded to form a transparent biaxially-oriented container body 41. The upper thread finish 34 has not been expanded, but is of sufficient thickness or material construction to provide the required strength. The bottle has an open top end 42 and receives a screw-on cap (not shown).

The expanded container body 41 includes an upper conical shoulder section 43 which generally increases in diameter from below the neck finish flange 35. Below shoulder portion 43 is an indented annular rib 44 and then a dome portion 45 which joins at its lower edge to a cylindrical panel section 46. The panel section 46 preferably has been stretched at an average planar stretch ratio of 9 to 12; the virgin PET layers have an average strain-induced crystallinity of 24 to 32%, and more preferably of 26 to 30%. The champagne-type base 47 has a standing ring 48 which surrounds a central push-up dome 49.

Figure 3:
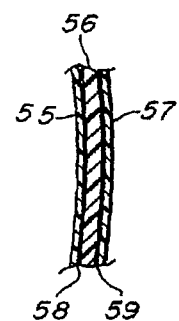
FIG. 3 is a horizontal cross-section taken along line 3-3 of FIG. 2, showing the multi-layer sidewall of the container.

FIG. 3 shows a cross-section of the container panel wall 46, including inner layer 55 of virgin PET, core layer 56 of recycled PET, outer layer 57 of virgin PET, and inner and outer intermediate layers 58, 59 of the oxygen-scavenging composition. In this embodiment, the relative percent by total weight of the various layers in the panel section are about 25% for inner layer 55, about 41% for core layer 56, about 28% for outer layer 57, and the intermediate scavenger layers 58 and 59 together are about 5.6 weight percent. The container overall contains 7.5 weight percent of the scavenger. Depending on the application, there may be a substantially uniform thickness of the scavenger layer throughout the container, or alternatively a relatively greater amount of scavenger in the panel (thinnest wall portion) over that in the much thicker neck portion and/or base regions, where the greater thickness PET layers provide sufficient passive barrier protection. Preferably, the scavenger layer is of substantially uniform thickness in the panel. This container provides a shelf-life for beer of no greater than 50 parts-per-billion (ppb) of oxygen over 112 days (16 weeks).

The multilayer bottle of the present invention has a superior delamination resistance even upon dropping or upon exposure to impact. In addition, the multilayer bottle has a large freedom of design without limitations to specific shapes with less irregularities or less bends owing to less occurrence of delamination even when the bottle is of such a shape having irregularities or bends. The multilayer bottle of the present invention is suitably used to store and preserve various products therein. Examples of the products stored or preserved in the multilayer bottle include liquid beverages such as carbonated beverage, juice, water, milk, sake, whisky, coffee, tea, jelly beverage and healthy beverage, seasonings such as liquid seasoning, sauce, soy sauce, dressing and liquid soup stock, liquid processed foodstuffs such as liquid soup, liquid drugs, beauty wash, milky lotion, hair dressing, hair dye, shampoo, etc.

The following examples are provided for the purpose of further illustrating the present invention but are by no means intended to limit the same.

EXAMPLES

The following process and characterizations were used for the examples and comparative examples of the multilayer PET containers comprising barrier polyamides and the thermoplastic adhesion-promoting additives.

Blending Process for Barrier Polyamide and Adhesion-Promoting Agent (General)

A predetermined amount of the thermoplastic adhesion-promoting agent (typically 2 to 10 weight %) is added to dry pellets of barrier polyamide such as, for example, MXD6 and then tumble blended to get a good mixing. The dry solid-solid blend is then fed either directly into the preform injection molding machine or is "pre-compounded" in a twin-screw extruder melt compounding process. For the pre-compounding step, a 2003 Coperion model ZSK25 twin screw laboratory extruder with 2 hole die was used. In a typical melt blending process used for a 95/5 weight ratio blend of PA-MXD6 (grade 6022 from Mitsubishi Gas Chemical) and a polyester TPU (Estane® ETE60DS3 grade from Lubrizol), an extruder barrel temperature of 265° C., melt temperature of 278° C. and extrusion screw speed of 125 RPM and a throughput rate of 10 lbs/hr was used. The blend extrudate was cooled on a Sandvik steel cooling belt table and the strand was palletized with a Coperion pelletizer Preform Coinjection Molding 5-layer performs were made by a sequential co-injection process described above. In the PET feed extruder (extruder "A" heated to 260-270° C.), a commercial bottle grade PET (0.85 IV PET from M&G) dried to low moisture content <10 ppm was used. In the barrier polyamide feed extruder (extruder "B" heated to 240-260° C.), the MXD6 blend comprising the thermoplastic adhesion-promoting agent as described above was tumble blended with about 0.25% of cobalt neodecanoate powder and then fed into the extruder. The two melt feeds from the A & B extruders at 5 were sequentially injection molded, using a 2003 Battenfeld A800/200H/125HC co-injection molding machine into a single cavity 30 g 33 mm finish ketchup bottle preform to form a 5 layer preform with 2 layers of the barrier polyamide material comprising 1.5% of the total preform weight. The cycle time for molding was about 31 sec.

The Reheat Stretch-Blowmolding of the Performs into Bottles:

The $2^{nd}$ step of stretch-blowmolding of the above multilayer performs into multilayer bottles was performed according to the general procedure described above and known to those skilled in the art. In the present examples, the bottles were stretch blown on a Sidel SBO-1 machine running at 850 bottles per hour. In the process, the performs were typically heated to a surface temperature of 99° C. prior to the blowing operation. The blow mold temperature was about 12° C. The blow pressures were about 33 bar.

Delamination Testing of the 5-Layer PET Bottles by an 'Angle Drop' Impact Test

Thirty rectangular ketchup bottles of the 5-layer structure (PET/barrier polyamide/PET/barrier polyamide/PET), which included the adhesion-promoting agent) were made as described above. Each bottle was flood filled within ½" from the top with room temperature water and capped securely. One at a time, each upright bottle is dropped through a guide tube straight down from 6 feet onto a steel plate which is angled at 17 degrees from horizontal. The bases of the bottles are somewhat rectangular, so the base of the bottle first impacts on the longer side of the base. The bottles are inspected and noted for degree and location of leakage or delamination. The delamination is ranked as major (up to 1" visible) or minor (barely visible).

As illustrated in the Table 1, in contrast to the control example which showed up to 40% delamination (mostly major delaminations), the examples of the present invention exhibited significant reduction (i.e., up to 80%) in delamination particularly in the reduction of the number of major delaminations in the above described angle drop impact stress tests.

The comparative examples No. 1-4, illustrate that any additive known to be compatible with PET-alone or polyamide-alone is essentially ineffective for improving the delamination resistance of the multilayer containers relative to the control example. The examples of the present invention on the other hand are significantly superior to both the control and comparative examples, in achieving delamination-resistance in PET-barrier polyamide multilayer containers. It is believed that the preferred additives of this invention are mutually compatible in both the PET and polyamide phases, thus strengthening the interlayer interface.

CONTROL & COMPARATIVE EXAMPLES

The control and comparative examples described herein are used as reference points for comparison to the examples of this invention to illustrate the improvement achieved in delamination-resistance of PET-barrier polyamide multilayer bottles.

Control Example

A standard 5-layer (PET/barrier PA/PET/barrier PA/PET) bottle containing 1.5% MXD6, 200 ppm Co and no thermoplastic adhesion-promoting agent was made by the co-injection stretch blow molding process described above.

Comparative Example 1

A blend of 2 parts of ethylene-methyl acrylate-glycidyl methacrylate terpolymer (Lotader® AX8900 from Arkema Inc., Philadelphia, Pa.) and 98 parts of MXD6 (Grade 6022 from Mitsubishi Gas Chemical) was pre-compounded in a twin-screw extruded as described above. The pre-compounded MXD6/additive blend was mixed with 0.25% cobalt neodecanoate powder and fed into the "B" extruder of the co-injection molding machine to make the 5-layer PET/barrier PA preforms as described above. The preforms were blown as described above into the 5-layer PET bottles containing 1.5% barrier polyamide layers.

Comparative Example 2

A dry blend of 2 parts of phenoxy resin (InchemRez® Phenoxy PKHB grade from Inchem Corporation, Rock Hill, S.C.) and 98 parts of MXD6 (Grade 6022 from Mitsubishi Gas Chemical) was tumble blended with 0.25% cobalt neodecanoate powder and fed directly into the "B" extruder of the coinjection preform molding machine to make the 5-layer PET/barrier polyamide preforms as described above. The preforms were blown into the corresponding 5-layer PET bottles containing 1.5% barrier polyamide layers.

Comparative Example 3

Same as Comparative Example 2 except that a dry blend of 5 parts of Phenoxy PKHB, 95 parts of MXD6 and 0.25 phr cobalt neodecanoate was used (parts per hundred parts of resin).

Comparative Example 4

A mixture of 10 parts of PA-6I/6T, an amorphous nylon (Grivory® G21 Grade from EMS) and 90 parts of MXD6

(Grade 6022 from Mitsubishi Gas Chemical) was pre-compounded and melt blended in a twin-screw extruded as described above. The pre-compounded PA-MXD6/amorphous nylon additive blend was tumble blended with 0.25% cobalt neodecanoate powder and fed into the "B" extruder of the coinjection molding machine to make the 5-layer PET/barrier PA preforms as described above. The preforms were blown also as described before into the 5-layer PET bottles containing 1.5% barrier polyamide.

Example 1

A blend of 2 parts of a polyester TPU (Estane® ETE60DS3 grade from Lubrizol) and 98 parts of MXD6 (Grade 6022 from Mitsubishi Gas Chemical) was compounded in a twin-screw extruded as described above. The pre-compounded MXD6/polyester TPU blend was then tumble blended with 0.25% cobalt neodecanoate powder and fed into the "B" extruder of the coinjection molding machine to make the 5-layer PET/barrier PA preforms as described above. The preforms were blown as before into 5-layer PET bottles containing 1.5% barrier polyamide layers.

Example 2

A blend of 5 parts of a polyester TPU (Estane® ETE60DS3 grade from Lubrizol) and 95 parts of PA-MXD6 (Grade 6022 from Mitsubishi Gas Chemical) was compounded in a twin-screw extruded as described above. The pre-compounded PA-MXD6/polyester TPU blend was then tumble blended with 0.25% cobalt neodecanoate powder and fed into the "B" extruder of the coinjection molding machine to make the 5-layer PET/barrier PA preforms as described above. The preforms were blown as before into 5-layer PET bottles containing 1.5% barrier polyamide layers.

Example 3

Same as in Example #1 except that 7% polyester TPU was compounded in the PA-MXD6 resin and used to make the corresponding 5-layer PET bottles containing 1.5% barrier polyamide layers.

Example 4

A dry blend of 2 parts of a caprolactone modified phenoxy resin (InchemRez® Phenoxy PKCP-80 Grade from Inchem Corporation, Rock Hill, S.C.) and 98 parts of PA-MXD6 (Grade 6022 from Mitsubishi Gas Chemical) was tumble blended with 0.25% cobalt neodecanoate powder and fed directly into the "B" extruder of the coinjection preform molding machine to make the 5-layer PET/barrier polyamide preforms as described above. The preforms were blown into the corresponding 5-layer PET bottles containing 1.5% barrier polyamide layers.

Example 5

Same as in Example 4 except that 5 parts caprolactone modified phenoxy resin was blended with 95 parts of PA-MXD6 and 0.25 phr cobalt neodecanoate to make the 5-layer PET bottles containing 1.5% barrier polyamide layers.

The results are provided in Table 1.

TABLE 1

Effect of thermoplastic adhesion-promoting agents ("Additive C") in 5-layer PET/MXD6/PET/MXD6/PET bottles and the results of layer delamination in 6 ft. height, 17° angle drop tests on filled bottles.

| Example | Additive C | % Additive C (based on MXD6) | % Delaminated in 6 ft. angle drop test Total | major |
|---|---|---|---|---|
| Control | None | None | 40 | 37 |
| Comp. Ex. 1 | E-MA-GMA[1] | 2 | 100 | 80 |
| Comp. Ex. 2 | Phenoxy resin[2] | 2 | 70 | 57 |
| Comp. Ex. 3 | Phenoxy resin[2] | 5 | 43 | 27 |
| Comp. Ex. 4 | PA6I/6T resin[3] | 10 | 37 | 23 |
| Example 1 | Polyester-TPU[4] | 2 | 33 | 0 |
| Example 2 | Polyester-TPU[4] | 5 | 6 | 3 |
| Example 3 | Polyester-TPU[4] | 7 | | |
| Example 4 | PKCP-80 | 2 | 46 | 13 |
| Example 5 | PKCP-80 | 5 | 16 | 7 |

PET = 98.5 w %;
Barrier layer (MXD6) = 1.5 w % (total);
Thermoplastic additive C added into the MXD6.

Notes:
[1]E-MA-GMA is an Ethylene-methyl acrylate-glycidyl methacrylate terpolymer (Lotader ®AX8900) from Arkema Inc., Philadelphia, PA.
[2]InchemRez ® Phenoxy resin, PKHB grade from Inchem Corporation, Rock Hill, SC.
[3]PA6I/6T is an amorphous nylon, Grivory ® G-21 grade from EMS-Chemie AG.
[4]Polyester TPU is a polyester polyol-based thermoplastic polyurethane, Estane ® ETE60DS3 grade from Lubrizol Corporation, Wilmington, DE.
[5]InchemRez ® PKCP-80 is a caprolactone-modified phenoxy resin, a 'comb-like' polymer from Inchem Corporation, Rock Hill, SC.

The foregoing examples and description of the preferred embodiments should be taken as illustrating, rather than as limiting the present invention as defined by the claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein.

The invention claimed is:

1. A plastic container having a multilayer wall comprising:
   at least one layer of a barrier resin comprising MXD6 polyamide adjacent to two layers of PET such that there is an interface between the MXD6 polyamide and each of the PET layers, wherein the at least one barrier resin also comprises
   an adhesion promoting agent blended with the MXD6 polyamide, wherein the adhesion promoting agent is at least one selected from either formula I or formula II:

$$\sim\sim(X-Y)_n\sim\sim \quad \text{or} \quad (I)$$

$$\sim\sim(X)_m\sim\sim(X)_p\sim\sim \atop | \atop Y \quad (II)$$

wherein:
   X is an MXD6 polyamide-compatible oligomeric or polymeric moiety selected from the group consisting of: a polycaprolactone modified phenoxy and a polyurethane;
   Y is a polyester-compatible oligomeric or polymeric moiety selected from the group consisting of: an aliphatic polyester and a co-polyester;
   n is an integer from 1 to 100; and m and p represent the mole fractions of the respective parts such that m+p=1, and wherein the adhesion promoting agent bonds the at least one layer of barrier resin with the PET layers across the interfaces.

2. The plastic container of claim 1 wherein the MXD6 is selected from the group consisting of: MXD6/T and MXD6/66.

3. The plastic container of claim 1 wherein the MXD6 polyamide is a blend of the MXD6 and a transition metal catalyst.

4. The plastic container of claim 3 wherein the transition metal catalyst comprises cobalt.

5. The plastic container of claim 1 wherein X comprises a phenoxy moiety represented by the structure:

$$\sim\sim O-Ar^2-OCH_2CHCH_2\sim\sim, \atop | \atop OH$$

wherein $Ar^2$ is an arylene selected from the group consisting of: m- or p-phenylene, bisphenol A, biphenylene, and methylene-bis-4,4'diphenylene.

6. The plastic container of claim 1 wherein X is a polyurethane moiety, it may be represented by a general structure of:

$$\sim\sim OCOHN-Ar^3-NHCOOR\sim\sim,$$

wherein $Ar^3$ is an arylene group selected from the group consisting of: m-phenylene, m-xylylene, 4,4' biphenylene, and methylene-bis-4,4' diphenylene.

7. The plastic container of claim 1 wherein Y portion of the adhesion-promoting agent is a polyester moiety represented by the structure:

$$\sim\sim O(CH_2)_pOCO(CH_2)_qCO\sim\sim \quad \text{or} \quad \sim\sim O(CH_2)_pCO\sim\sim,$$

wherein p is an integer from 1-6; and q is an integer from 1-12.

8. The plastic container of claim 1 wherein the X portion of the adhesion-promoting agent is polyurethane and the Y portion is a polyester thereby defining a polyester TPU.

9. The plastic container of claim 8 wherein the polyester TPU is prepared by reacting a) a polyester diol, b) a diisocyanate, and c) a glycol chain extender in the presence of a suitable catalyst.

10. The plastic container of claim 9 wherein:
   a) the polyester diol is a linear polyester diol with terminal hydroxyl groups having a molecular weight of from about 500 to about 5,000;
   b) the diisocyanate is selected from the group consisting of: diphenyl methane-4,4'-diisocyanate (MDI), m-xylylene diisocyanate (MXDI), tetramethyl m-xylylene diisocyanate (TMXDI), toluene 2,4/2,6-diisocyanate (TDI), isophorone diisocyanate (IPDI), hexamethylene diisocyanate (HDI), and mixtures thereof; and
   c) the glycol chain extender is selected from the group consisting of: ethylene glycol, 1,4-butanediol, 1,6-hexanediol, and mixtures thereof.

11. The plastic container of claim 10 wherein the polyester diol is produced by (a) an esterification reaction of a glycol monomer with a dicarboxylic acid monomer or (b) by a transesterification reaction of a glycol monomer with a dimethyl ester of a dicarboxylic acid monomer or (c) by a ring opening polymerization of a cyclic lactone.

12. The plastic container of claim 11 wherein the dicarboxylic acid monomer is a $C_4$-$C_{12}$ aliphatic dicarboxylic acid; and the glycol monomer is a $C_2$-$C_{12}$ aliphatic glycol.

13. The plastic container of claim 11 wherein polyester diol is produced by a ring opening polymerization of caprolactone with diethylene glycol.

14. The plastic container of claim 10 wherein the polyester diol is selected from the group consisting of: poly(ethylene adipate), poly(butylenes adipate), and polycaprolactone.

15. The plastic container of claim 1 wherein the X portion of the adhesion-promoting agent is polyurethane and the Y portion is a polyether thereby defining a polyether TPU.

16. The plastic container of claim 15 wherein the polyether TPU is prepared by reacting a) a polyether diol or polyol, b) a diisocyanate, and c) a glycol chain extender in the presence of a suitable catalyst.

17. The plastic container of claim 16 wherein:
   a) the polyether diol is a linear polyether diol with terminal hydroxyl groups having a molecular weight of from about 400 to about 4,000;
   b) the diisocyanate is selected from the group consisting of: diphenyl methane-4,4'-diisocyanate (MDI), m-xylylene diisocyanate (MXDI), tetramethyl m-xylylene diisocyanate (TMXDI), toluene 2,4/2,6-diisocyanate (TDI), isophorone diisocyanate (IPDI), hexamethylene diisocyanate (HDI), and mixtures thereof; and
   c) the glycol chain extender is selected from the group consisting of: ethylene glycol, 1,4-butanediol, 1,6-hexanediol, and mixtures thereof.

18. The plastic container of claim 17 wherein the polyether diol is selected from the group consisting of: poly(ethylene glycol) (PEG) comprising poly (oxyethylene) backbone with terminal hydroxyl groups, poly(propylene glycol) (PPG) comprising poly (oxypropylene) backbone with terminal hydroxyl groups, and poly(tetramethylene ether glycol) (PTMEG) comprising poly(oxytetramethylene) backbone with terminal hydroxyl groups.

19. The plastic container of claim 1 wherein the X portion of the adhesion-promoting agent is the polycaprolactone modified phenoxy resin and the Y portion is a polyester thereby defining a polyester grafted phenoxy resin.

20. The plastic container of claim 19 wherein the polyester grafted phenoxy resin is prepared by reacting a phenoxy resin with a caprolactone in the presence of a catalyst.

21. The plastic container of claim 1 wherein the amount of the adhesion promoting agent blended with the barrier resin does not exceed 7% by weight of the blend.

22. A preform for blow molding a plastic container having a multilayer wall comprising:
   at least one layer of a barrier resin comprising a MXD6 polyamide adjacent to two layers of PET such that there is an interface between the MXD6 polyamide and each of the PET layers, wherein the at least one barrier resin also comprises
   an adhesion promoting agent blended with the MXD6 polyamide, wherein the adhesion promoting agent is at least one selected from either formula I or formula II:

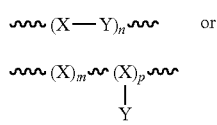

wherein:
X is an MXD6 polyamide-compatible oligomeric or polymeric moiety selected from the group consisting of: a polycaprolactone modified phenoxy and a polyurethane;
Y is a polyester-compatible oligomeric or polymeric moiety selected from the group consisting of: an aliphatic polyester and a co-polyester;

n is an integer from 1 to 100; and m and p represent the mole fractions of the respective parts such that m+p=1, and wherein the adhesion promoting agent bonds the at least one layer of barrier resin with the PET layers across the interfaces.

23. The preform of claim 22 wherein X comprises a phenoxy moiety represented by the structure:

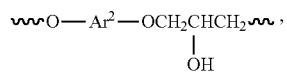

wherein $Ar^2$ is an arylene selected from the group consisting of: m- or p-phenylene, bisphenol A, biphenylene, and methylene-bis-4,4' diphenylene.

24. The preform of claim 22 wherein X is a polyurethane moiety, it may be represented by a general structure of:

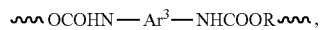

wherein $Ar^3$ is an arylene group selected from the group consisting of: m-phenylene, m-xylylene, 4,4' biphenylene, and methylene-bis-4,4' diphenylene.

25. The preform of claim 22 wherein Y portion of the adhesion-promoting agent is a polyester moiety represented by the structure:

wherein p is an integer from 1-6; and q is an integer from 1-12.

26. The preform of claim 22 wherein the X portion of the adhesion-promoting agent is polyurethane and the Y portion is a polyester thereby defining a polyester TPU.

27. The preform of claim 26 wherein the polyester TPU is prepared by reacting a) a polyester diol, b) a diisocyanate, and c) a glycol chain extender in the presence of a suitable catalyst.

* * * * *

UNITED STATES PATENT AND TRADEMARK OFFICE
CERTIFICATE OF CORRECTION

| | | |
|---|---|---|
| PATENT NO. | : 8,822,001 B2 | Page 1 of 1 |
| APPLICATION NO. | : 12/768130 | |
| DATED | : September 2, 2014 | |
| INVENTOR(S) | : Murali K. Akkapeddi et al. | |

It is certified that error appears in the above-identified patent and that said Letters Patent is hereby corrected as shown below:

In the Claims:

In Claim 22, Column 23, Line 21 change "at least one layer of a barrier resin comprising a MXD6" to --at least one layer of a barrier resin comprising MXD6--

Signed and Sealed this
Twenty-second Day of December, 2015

Michelle K. Lee
*Director of the United States Patent and Trademark Office*